(12) United States Patent
Charette et al.

(10) Patent No.: US 12,030,590 B2
(45) Date of Patent: *Jul. 9, 2024

(54) CHAIN GUIDE

(71) Applicant: Fox Factory, Inc., Duluth, GA (US)

(72) Inventors: Robert Charette, Burnaby (CA); Douglas Chalmers, Burnaby (CA); Evan Michael Choltco-Devlin, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,619

(22) Filed: Feb. 27, 2023

(65) Prior Publication Data

US 2023/0219653 A1 Jul. 13, 2023

Related U.S. Application Data

(63) Continuation of application No. 16/852,200, filed on Apr. 17, 2020, now Pat. No. 11,603,167.

(60) Provisional application No. 62/836,502, filed on Apr. 19, 2019.

(51) Int. Cl.
*B62M 9/16* (2006.01)
*B62M 9/00* (2006.01)

(52) U.S. Cl.
CPC ......... *B62M 9/16* (2013.01); *B62M 2009/007* (2013.01)

(58) Field of Classification Search
CPC .................... B62M 9/16; B62M 2009/007
USPC ............................................. 474/140
See application file for complete search history.

(56) References Cited

U.S. PATENT DOCUMENTS

| 2017/0045121 A1* | 2/2017 | Staples ............... B62M 9/121 |
| 2018/0022418 A1* | 1/2018 | Pfeiffer ............... B62M 9/136 |
| | | 474/140 |
| 2019/0127023 A1* | 5/2019 | Fujimoto ............ B62M 9/126 |

* cited by examiner

*Primary Examiner* — Gene O Crawford
*Assistant Examiner* — Emily R Kincaid

(57) ABSTRACT

A chain guide is disclosed herein. The chain guide includes a backplate and a chain guide. The backplate has an elongated opening therein. The chain guide includes a guide to orient a chain with respect to the sprocket. The chain guide also includes a retaining assembly to removably and adjustably frictionally couple the guide at a given location along the elongated opening in the backplate, such that when the guide is rotated axially about the retaining assembly, the guide is retained at the given location.

12 Claims, 6 Drawing Sheets

CHAIN GUIDE

CROSS-REFERENCE TO RELATED APPLICATION

This application claims priority to and benefit of co-pending U.S. patent application Ser. No. 16/852,200, filed on Apr. 17, 2020, entitled "CHAIN GUIDE" by Robert Charette at al., and assigned to the assignee of the present application, the disclosure of which is hereby incorporated by reference in its entirety.

The application Ser. No. 16/852,200 claims priority to and benefit of U.S. Provisional Patent Application No. 62/836,502 filed on Apr. 19, 2019, entitled "CHAIN GUIDE" by Robert Charette at al., and assigned to the assignee of the present application, the disclosure of which is hereby incorporated by reference in its entirety.

FIELD OF THE INVENTION

Embodiments of the invention generally relate to a drive chain guide for a chain driven vehicle.

BACKGROUND

Rear suspension assemblies are often utilized on bicycles to absorb energy imparted to the rear wheel by the terrain over which the bicycle is being ridden. The use of a rear suspension shock system allows a rider to traverse rougher terrain, at a greater speed and with less fatigue in comparison to riding a bicycle equipped with a rigid rear frame. However, with or without rear suspension assemblies, a hard motion, branch, or the like can cause the chain to depart from the sprocket.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Definitions

Chain stay length: The distance between bottom bracket (where the crank attaches to bicycle frame) and the rear wheel axis. On a rigid frame bike, unless the frame fails, the distance between the bottom bracket and the rear wheel axis will remain the same. However, on a rear suspension bicycle, unless the main suspension arm pivots directly about the bottom bracket axis, the chain stay length changes as the suspension pivots.

Pedal bob: A suspension motion caused when the rider is standing up and pedaling. As the rider reaches the bottom of the crank/pedaling circle, a dead spot is created in the pedal circle as the rider's weight momentarily comes to reset on the pedal that is at the bottom of the pedal circle and before the opposite leg can begins to pick up the rider weight on the opposite downward pedal stroke. Pedal bob wastes energy that is input into the bicycle as the suspension will absorb a portion of the energy in the form of suspension friction instead of using all of the input energy for propulsion.

Anti-squat: is a measure of how much the suspension and/or chain tension maintainer resists pedal bob.

Pedal kickback: if there are high levels of anti-squat, during times of sudden suspension compression, the suspension will not be able to absorb the compression and this will result in the crank being forced to rotate backwards due to the lengthening of the chain stay length occurring faster than the suspension and/or chain tension maintainer can increase the available operational length of chain.

Operation

Figure 1:
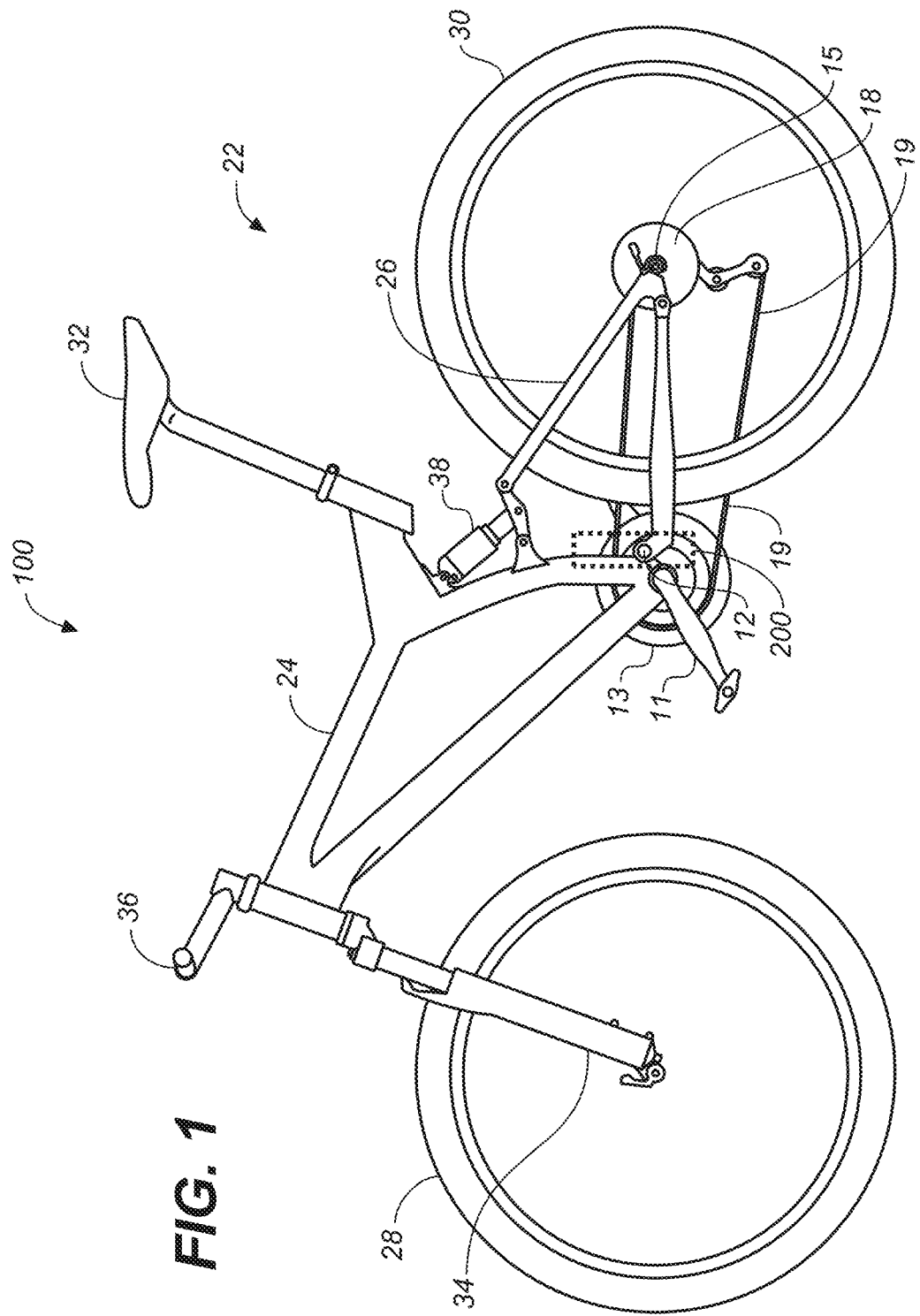
FIG. 1 is a perspective view of a bicycle having a rear suspension setup, in accordance with an embodiment.

FIG. 1 illustrates a bicycle 100. In one embodiment, chain guide assembly 200 is shown in a configuration with bicycle 100. Bicycle 100 includes a front wheel 28 which is coupled to the main frame 24 via fork 34 and a rear wheel 30 which is coupled to the main frame 24 via swing arm portion 26. A seat 32 is connected to the main frame 24 in order to support a rider of the bicycle 20.

The front wheel 28 is supported by a fork 34 which, in turn, is secured to the main frame 24 by a handlebar assembly 36. The rear wheel 30 is connected to the swing arm portion 26 of the frame 24 at rear wheel axis 15. A rear shock 38 is positioned between the swing arm 26 and the frame 24 to provide resistance to the pivoting motion of the swing arm 26 about pivot point 12. Thus, the illustrated bicycle 100 includes a suspension member between swing arm 26 and the frame 24 which operate to substantially reduce rear wheel 30 impact forces from being transmitted to the rider of the bicycle 100.

In one embodiment, front forks 34 also provide a suspension function via a damping assembly in at least one fork leg; as such, in one embodiment, the bicycle 100 is a full suspension bicycle.

Although a full suspension bicycle 100 is shown, in one embodiment, bicycle 100 could have a rigid frame 22 (e.g., frame 24 fixedly coupled to swing arm portion 26) and/or rigid front forks 34 and thus be a semi-rigid or fully rigid (e.g., suspension-less) bicycle 100. In one embodiment, chain guide assembly 200 is used on non-suspended or partially suspended bicycle frames.

In one embodiment, bicycle 100 is driven by a chain 19 that is coupled with both front sprocket 13 and rear sprocket 18. As the rider pedals, the generated force causes front sprocket 13 to be rotated about its axis. This rotational energy from front sprocket 13 applies a force to chain 19 which transfers the energy to rear sprocket 18 where it is ultimately applied to rear wheel 30. In providing this energy transfer, it is important that the chain 19 remain properly oriented and coupled with front sprocket 13, especially during bumps, gear changes, and the like. Although a chain 19 is shown in one embodiment, in another embodiment, a final drive system such as a belt, or the like could be used.

Although described herein with respect to a bicycle 100. In one embodiment, chain guide assembly 200 could be used on any vehicle that transfers power from a first sprocket to a second sprocket via a final drive system such as a chain, belt, or the like. For example, a motorized bike, including for example, a combustion motor, an electric bike (e-bike), a hybrid electric and combustion bike, a hybrid motor and pedal driving bike, and the like.

Figure 2A:
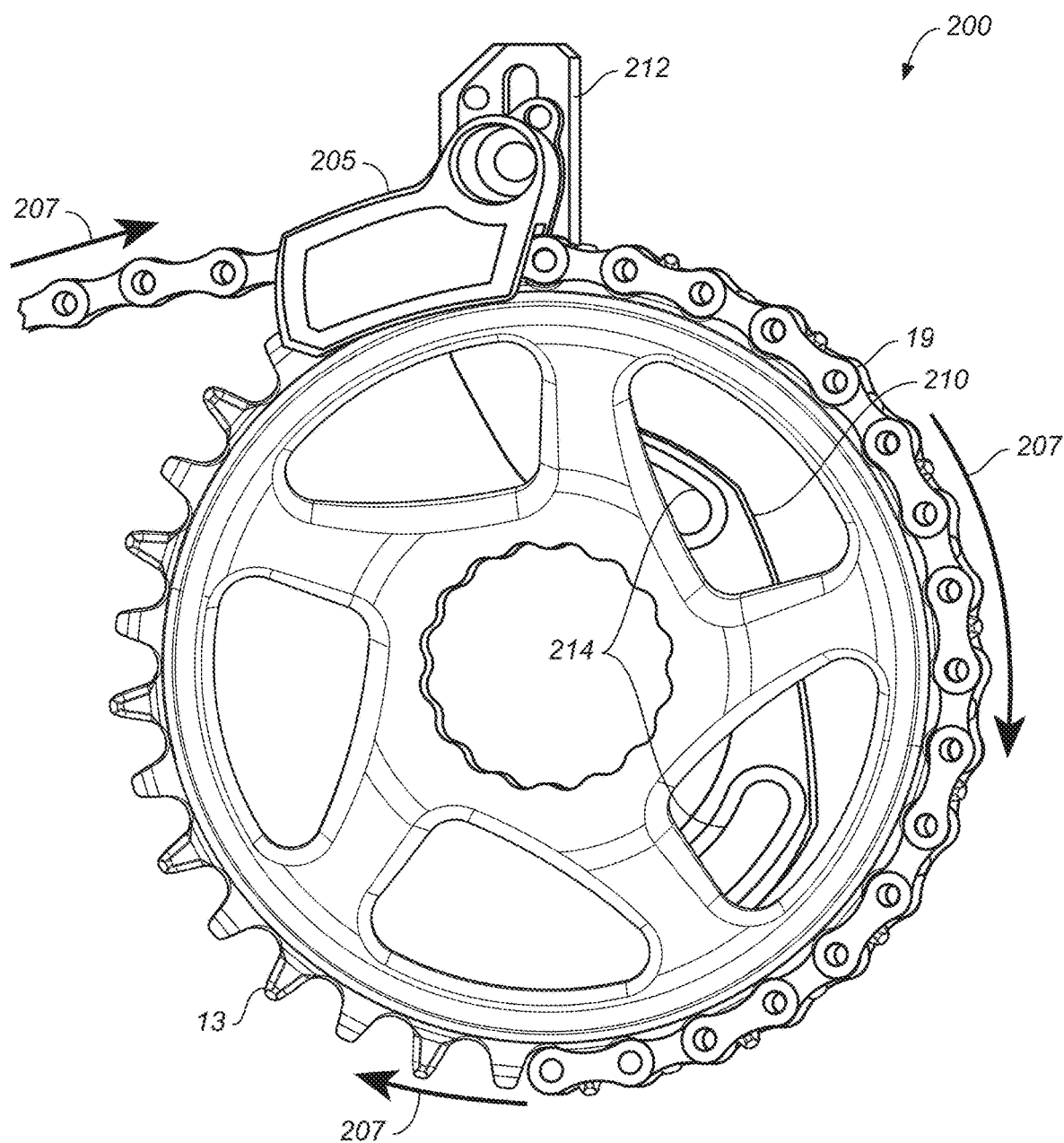
FIG. 2A is a side view of a chain guide, in accordance with an embodiment.

With reference now to FIG. 2A, a side view of a chain guide assembly 200 is shown in accordance with an embodiment. FIG. 2A also includes a sprocket 13 and a portion of chain 19 (moving about sprocket 13 in the direction indicated by arrows 207) for purposes of illustrating the basic orientation of chain guide assembly 200. In one embodiment, chain guide assembly 200 has two main components, a guide 205 and a backplate (or mounting plate) 210.

In general, sprocket 13 could be any type of sprocket used on a vehicle such as a bicycle, motorcycle, moped, go-cart, or the like. For example, it could be a front sprocket (e.g., where the drive energy is received) a rear sprocket (where the drive energy is transferred), or the like. Moreover, although a chain 19 is used in the examples provided in this discussion, it should be appreciated that the chain guide assembly 200 could be similarly used in a belt drive or other energy transfer configuration that uses some means to transfer energy from a first sprocket to a second remote sprocket.

Figure 2B:
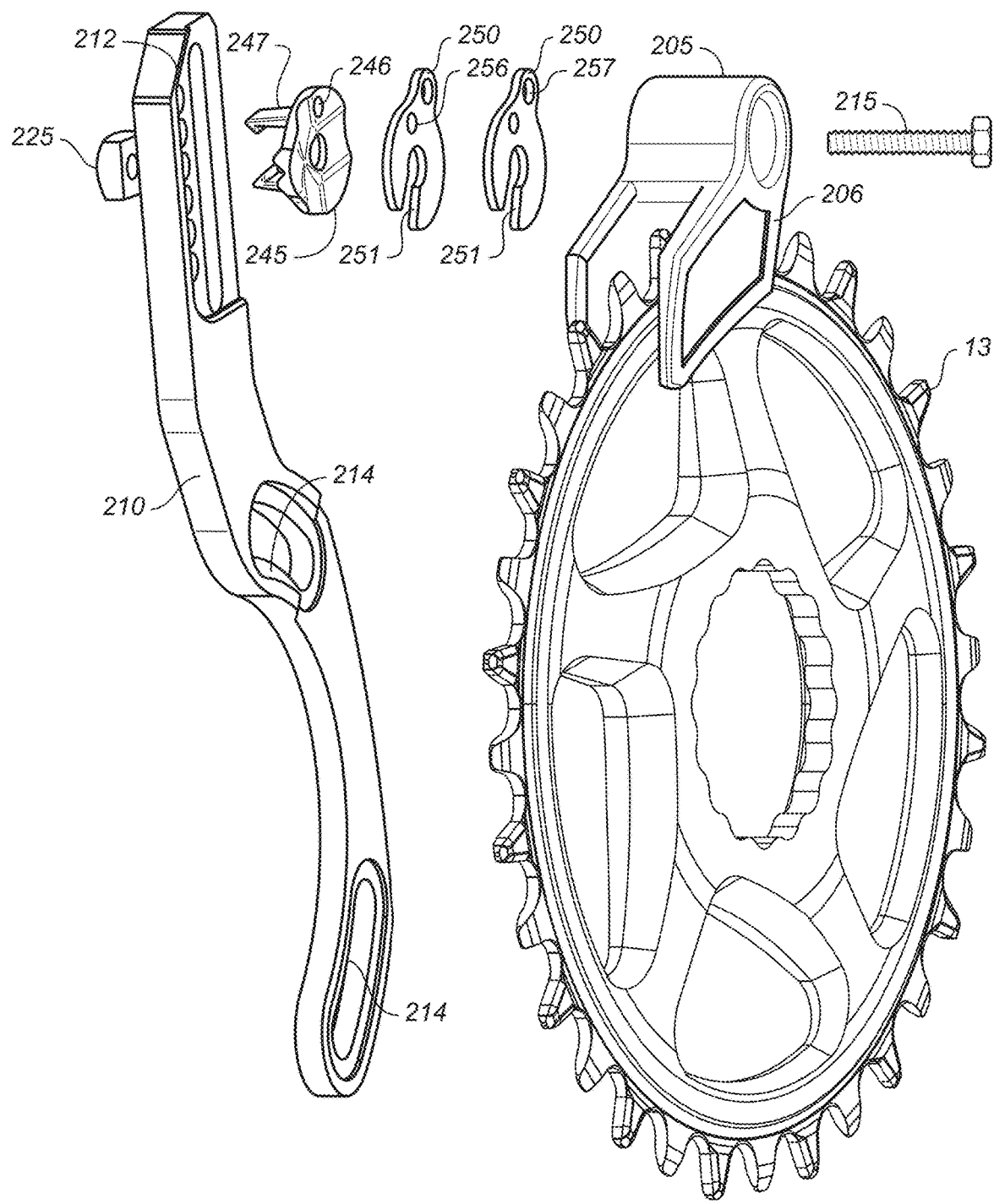
FIG. 2B is an exploded view of the chain guide, in accordance with an embodiment.

Referring now to FIG. 2B, an exploded view of the chain guide assembly 200 is shown in accordance with an embodiment. Guide 205 includes a first end having a retaining capability (e.g., nut 225, fastener 215, and a friction spacer 245) for removably and adjustably coupling the guide 205 with the backplate 210 and a second end that includes the guide 206 for guiding chain 19 onto a sprocket 13. As will be discussed herein, although the friction spacer 245 is shown as a separate component in FIG. 2B, it should be appreciated that in one embodiment, the friction spacer 245 and its bolt retaining arms 247 could be fixedly coupled with the guide 205 either during manufacture or by a fixed bond (weld, etc.) during assembly. In another embodiment, friction spacer 245 is a separate component to allow additional spacers 250 to be added to the guide 205. In one embodiment, chain guide assembly 200 can include a number of different spacers 250 to allow the guide 205 to be moved an appropriate distance from the backplate 210 to ensure the guide 205 is in a correct location with respect to the sprocket.

Backplate 210 includes a first portion having a retaining configuration 214 that is coupleable with a frame of a vehicle and a second portion that includes an elongated opening 212 for receiving the fastener 215 of the chain guiding portion. When coupled together, the guide 205 and the backplate 210 provide a complete chain guide assembly 200 as shown in FIGS. 2A and 2B.

The use of the two portions of the complete chain guide (hereinafter "chain guide assembly 200") provide a number of capabilities and a range of adjustability that allows chain guide assembly 200 to be used on a number of different vehicles, to be adjustable to changes in sprockets, sprocket size, etc. For example, when chain guide assembly 200 is mounted to a vehicle frame and positioned over the sprocket 13, the guide 205 will be moved about within the elongated opening 212 of the backplate 210 until a proper guide 206 height is obtained. Thus, during the setting-up of the chain guide assembly 200 there is a need to adjust or set the height (e.g., a radial adjustment) with respect to sprocket 13. In addition, there is also a need to set a rotational position of guide 205 such that the guide 205 is not contacting the chain 19 while maintain a standoff location that is within a predefined tolerance from the chain and sprocket in order to guide the chain. Once the location of the chain guide assembly 200 is "set", the fastener 215 of chain guide assembly 200 would be tightened down thereby fixing the guide 205 in the appropriate location for the sprocket 13 (or crankset, etc.).

Figure 4B:
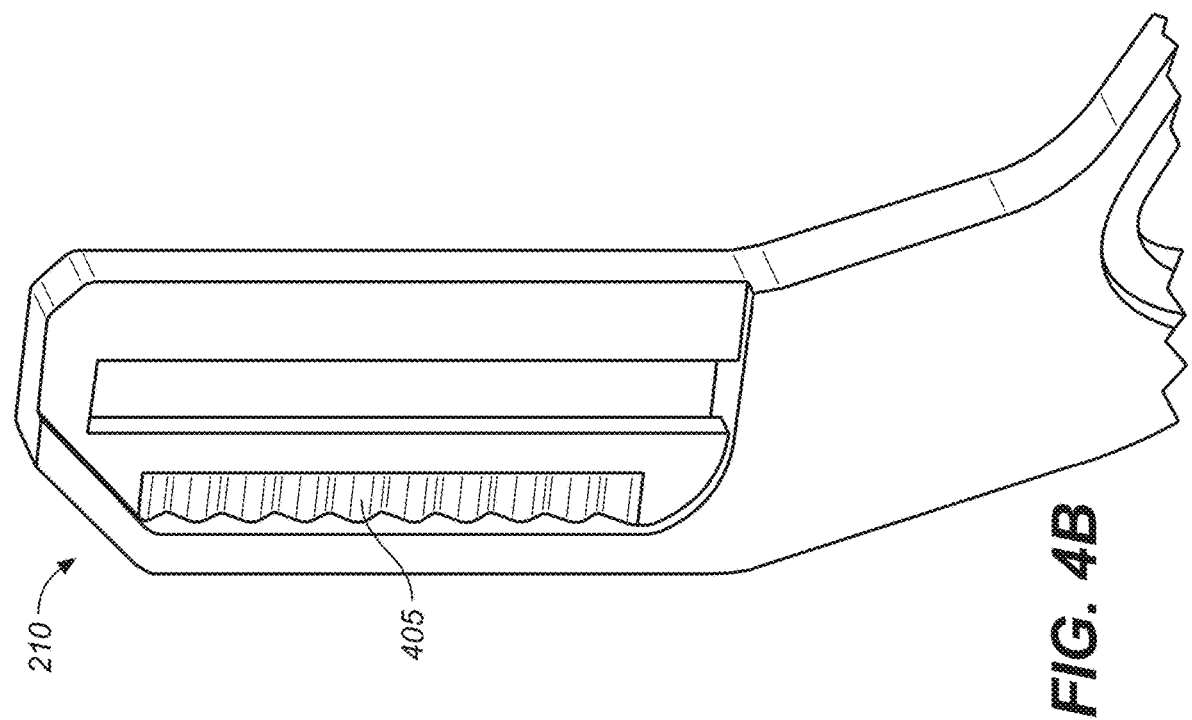
FIG. 4B is a side view of an indexing track on the backplate, in accordance with an embodiment.
Figure 4A:
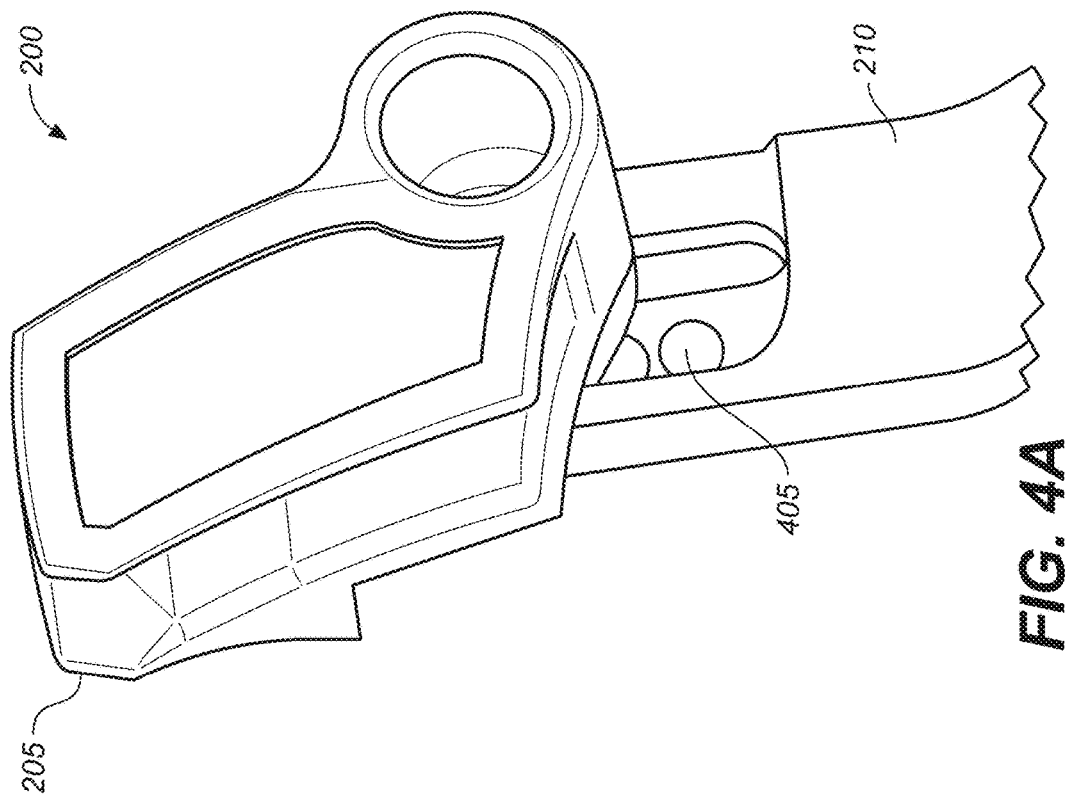
FIG. 4A is a side view of the chain guide with the chain guiding portion rotated out of position, in accordance with an embodiment.

Referring now to FIG. 4A and to FIGS. 2A and 2B, a side view of the chain guide assembly 200 with the guide 205 rotated out of position, is shown in accordance with an embodiment. In one embodiment, backplate 210 includes a number of indexing track 405 that are used in conjunction with features (e.g., notches 546 of FIGS. 5 and 6) to maintain a frictional position for guide 205 even when fastener 215 is loosened enough to allow guide 205 to rotate. In FIG. 4A, the features of indexing track 405 are dimples. With reference to FIG. 4B, the features of indexing track 405 are ridges. Although dimples and ridges are shown, it should be appreciated that any geometrical features that add friction could be utilized.

Referring again to FIG. 4A and to FIGS. 2A and 2B when adjusting, cleaning, or removing the sprocket 13, chain 19, and/or any of the crankset features, the guide 205 of chain guide assembly 200 will need to be moved out of its "set" position. In one embodiment, this would be performed by loosening the retaining fastener 215 and rotating the guide 205 so that it is moved from its "set" chain retaining location.

Once the fastener 215 of guide 205 has been loosened, there has previously been no way to retain the "set" axial and rotational position of the guide 205. As such, time would need to be taken during the tightening of fastener 215 to re-establish the "set" position of the guide 205. However, unlike prior chain guide designs, because of the indexing and notching disclosed herein such as the indexing track 405 and notches 546, when the retaining fastener 215 is loosened, the "set" axial and rotational position of the guide 205 is maintained. As such, when the chain guide is moved out of its "set" position (for whatever purpose) both the axial and rotational positions are easily reestablished due to the indexing and notching characteristics.

In one embodiment, moving guide 205 out of the way is performed by loosening the retaining fastener 215 and rotating guide 205 axially about retaining fastener 215 (e.g., upward), while the friction maintained between backplate 210 and friction spacer 245 stops any vertical change to the vertical location of the guide 205. In another embodiment, moving guide 205 out of the way would be performed by loosening the retaining fastener 215 and sliding guide 205 upward (e.g., radially away from the sprocket 13). In yet another embodiment, moving guide 205 out of the way would be performed by loosening the retaining fastener 215 and then performing a combination of rotation and axial movement of guide 205. In yet another embodiment, the moving guide 205 out of the way would be performed by loosening the retaining fastener 215 and then performing a complete removal of the guide 205.

Figure 5:
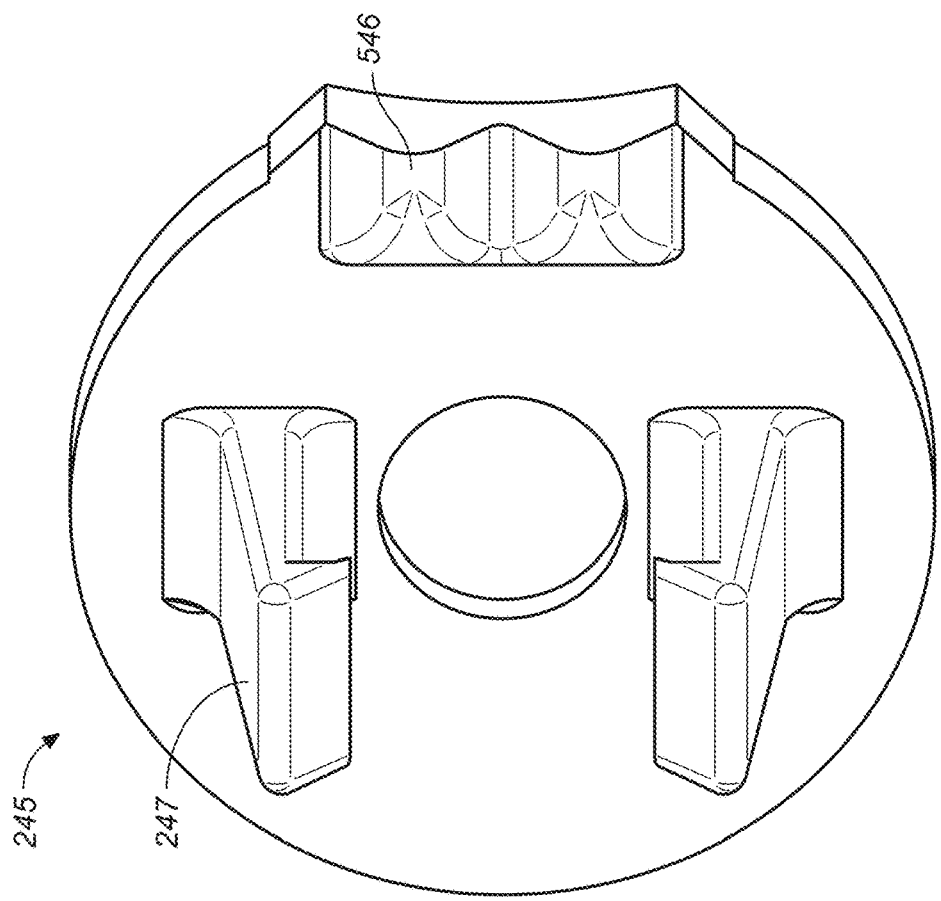
FIG. 5 is an orthogonal view of a snap fit type friction spacer, in accordance with an embodiment.

With reference now to FIG. 5, a snap fit type friction spacer 245 is shown in accordance with an embodiment. In general, snap fit type friction spacer 245 has two arms 247 and one or more notches 546 (or other feature such as a protrusion of any geometric shape) thereon. The notches 546 in snap fit type friction spacer 245 are aligned with a portion of an indexing track 405 on a backplate of the backplate portion. In one embodiment, snap fit type friction spacer 245 includes nut 225 captured between the two arms 247 that will hold snap fit type friction spacer 245 location on the backplate 210 of the chain guide assembly 200.

Figure 3:
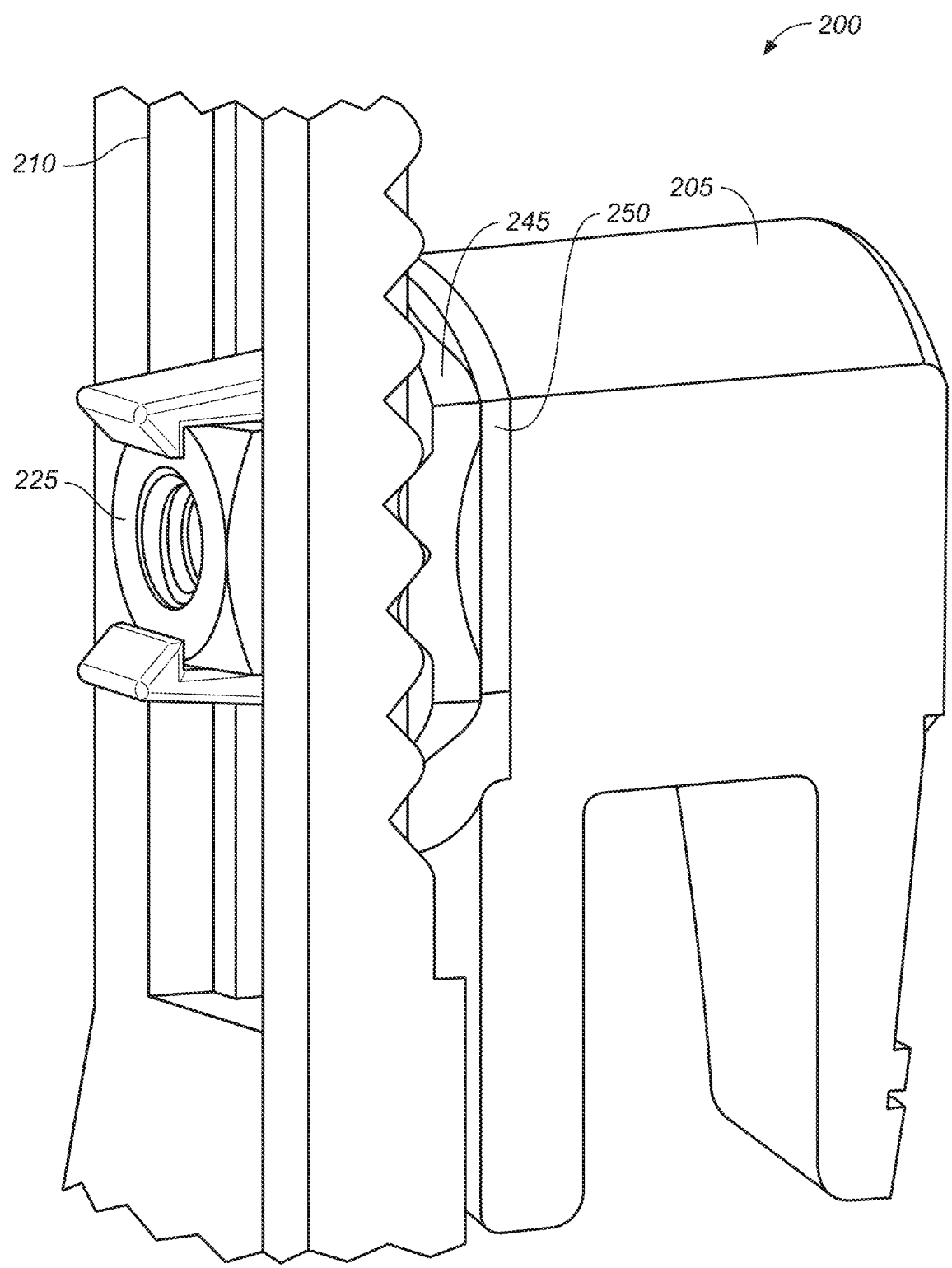
FIG. 3 is a back quartering view of the assembled chain guide, in accordance with an embodiment.

As shown in FIGS. 2A, 2B and 3, guide 205 and snap fit spacer 245 are fastened via fastener 215 (e.g., an Allen bolt or the like) to nut 225 and guide 205 is "set" in its proper location and orientation. Once the guide 205 is properly "set", fastener 215 and nut 225 can be tightened up.

At a later time, when there is a need to move guide 205 out of the way, the fastener 215 can be loosened or removed which will allow the guide 205 to be rotated out of the way or removed completely. However, because of the friction interaction between snap fit type friction spacer 245 and the backplate indexing track 405, even after the fastener 215 is loosened (or removed), the snap fit type friction spacer 245 will remain in its "set" location on the backplate indexing track 405. As such, the reinstallation of the guide 205 is just the reinsertion (if it was removed) of fastener 215 into and the tightening thereof. When the guide 205 is reinserted, because snap fit type friction spacer 245 did not ever move, the guide 205 will be at the previously established "set" height.

In one embodiment, snap fit type friction spacer 245 will include a dimple 246 or other (male or female) feature on the side opposite of the notches 546. The dimple will allow a mating between a dimple on the guide 205 to be able to be coupled together such that the guide 205 will also be in the previously "set" rotational position. In one embodiment, there may be a number of dimples on one or both of the snap fit type friction spacer 245 and/or the guide 205. In one embodiment, the initial rotational alignment could include a mark or other indicator to be made on the two components when they are in there "set" position. As such, when the guide 205 is reinserted into snap fit type friction spacer 245, the guide 205 will be rotated until the indicator is aligned. At that time, the fastener 215 can be tightened and the guide 205 will be back to its "set" location and orientation.

In one embodiment, snap fit type friction spacer 245 could be used to maintain the rotational orientation of the guide 205 after fastener 215 is loosened and the guide 205 can then be moved radially upward within the indexing track 405 of backplate 210. As such, the guide 205 will remain properly rotationally oriented but will be moved to a different radial height. When re-setting the location of guide 205, the rotational "set" position would have been maintained, and the height would be returned to the proper location on the indexing track 405. In one embodiment, the initial radial height alignment could include a mark or other indicator to be made between the backplate 210 and guide 205 when they are in there "set" position. As such, when the guide 205 is re-installed, the guide 205 will be lowered along indexing track 405 until the indicators are aligned.

Figure 6:
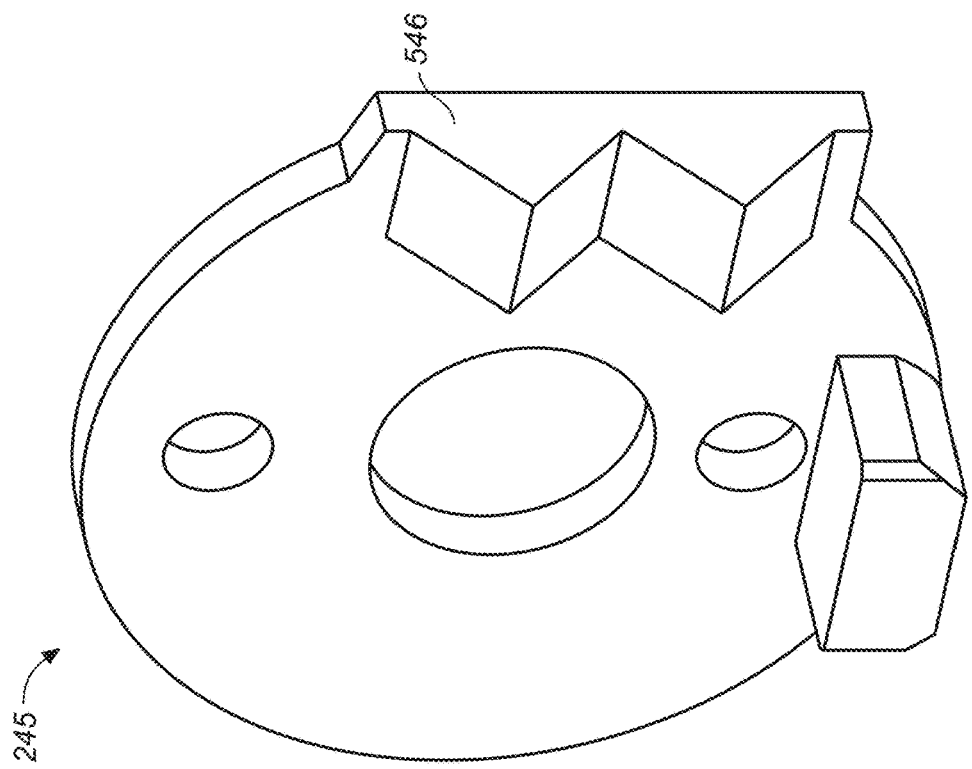
FIG. 6 is an orthogonal view of a notched type friction spacer, in accordance with an embodiment.

With reference now to FIG. 6, a notched type friction spacer 245 is shown in accordance with an embodiment. In one embodiment, a notched type friction spacer 245 is used instead of the snap fit type friction spacer 245. The notched type friction spacer 245 is similar to the snap fit type friction spacer 245 except the notched type friction spacer 245 does not have the bolt retaining arms 247. As such, the notched type friction spacer 245 will allow the fastener 215 to be loosened in order to allow guide 205 be rotated out of the way while the friction between the notches 546 and indexing track 405 will keep the notched type friction spacer 245 in its proper axial position. However, if fastener 215 is completely removed then the notched type friction spacer 245 may not be held in place. In one embodiment, once the change has been made (to chain, sprocket, etc.) the guide 205 will then be rotated back into its appropriate configuration and fastener 215 will be tightened. In so doing, the guide 205 will have remained at the previously established radial height.

In one embodiment, notched type friction spacer 245 include a dimple 246 or other (male or female) feature on the side opposite of the indexing side as described in FIG. 5 above.

In one embodiment, instead of being a distinct component, the notched type friction spacer 245 (or snap fit type friction spacer 245) could be manufactured as part of guide 205. In another embodiment, there could be any number of spacers 250 incorporated in the chain guide assembly 200 assembly to adjust the location of the guide 205 with respect to the sprocket 13. In one embodiment, instead of a spacer 250, there could be a threaded device that can be used to adjust the location of the guide 205 with respect to the sprocket 13.

In one embodiment, the spacers 250 could be similar to a washer, e.g., a round metal doughnut having a thickness. In another embodiment, spacers 250 could include u-style openings 251 such that they can be added or removed to fastener 215 by sliding (or snapping) into place about fastener 215. In so doing, spacers 250 can be added or removed without having to remove fastener 215 and threading them thereon. In one embodiment, each of the spacers 250 include a dimple 256 feature on both sides thereon such that each spacers 250 provides the orientation and nesting capability available on friction spacer 245. In one embodiment, there is also a grasping feature 257 (tab, hole, or the like) at an outer end of the spacers 250, the grasping feature 257 could be a geometric shape that allows the same Allen wrench that tightens the fastener 215 to be used to make a purchase on each of the spacers 250. This could be for help in putting on and taking off the snap-type spacers 250.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A chain guide assembly comprising:
a backplate, the backplate configured to be coupled with a frame of a vehicle and oriented with respect to a sprocket, the backplate comprising:
an elongated opening therein; and
a chain guide, the chain guide comprising:
a guide configured to orient a chain with respect to said sprocket; and
a retaining assembly configured to removably and adjustably frictionally couple said guide at a given location along the elongated opening in said backplate, such that when said guide is rotated axially about said retaining assembly, said guide is retained at said given location, wherein the retaining assembly comprises:
a fastener configured to retain said guide and pass partially through said elongated opening in said backplate such that said guide is on a first side of said backplate;
a nut located on a second side of said backplate opposite of said guide, said nut configured to retain said fastener with said backplate, wherein said backplate further comprises:
an indexing track about a portion of said elongated opening; and
a frictional spacer retained by said fastener between said guide and said backplate, said frictional spacer comprising:
an indexing feature configured to maintain an orientation between said frictional spacer and said backplate; and
a protrusion configured to provide a frictional connection with at least a portion of said indexing track of said backplate, said frictional connection configured to maintain said guide at said given location when said fastener is loosed such that said guide can be rotated axially about said fastener, wherein said frictional spacer is a portion of said guide.

2. The chain guide assembly of claim 1, wherein the indexing feature comprises:
two snap fit retaining arms configured to retain said frictional spacer with said nut in said given location on said backplate, such that removal of said fastener and said guide from said backplate will not change a location of said frictional spacer from said given location.

3. The chain guide assembly of claim 2, wherein said guide is configured in a given orientation with respect to said chain, and the frictional spacer further comprises:
a rotational alignment feature on a side of said frictional spacer facing said guide, said rotational alignment feature configured to identify said given orientation of said guide such that when said fastener and said guide are recoupled with said frictional spacer and said backplate, said guide will be in said given location and can use said rotational alignment feature to return to said given orientation.

4. The chain guide assembly of claim 1, wherein said guide is configured in a given orientation with respect to said chain, and the frictional spacer further comprises:
a rotational alignment feature on a side of said frictional spacer facing said guide, said rotational alignment feature configured to identify said given orientation of said guide such that when a location of said guide is changed from said given location on said backplate, said guide will remain in said given orientation.

5. The chain guide assembly of claim 1, wherein the retaining assembly further comprises:
at least one offset spacer between said guide and said frictional spacer, said at least one offset spacer configured to be removably coupleable with said fastener without requiring a removal of said fastener, said at least one offset spacer configured to modify a horizontal location of said guide with respect to said backplate and said sprocket.

6. A chain guide assembly comprising:
a backplate, the backplate configured to be coupled with a frame of a vehicle and oriented with respect to a sprocket, the backplate comprising:
an elongated opening therein; and
a chain guide, the chain guide comprising:
a guide configured to orient a chain with respect to said sprocket; and
a retaining assembly comprising:
a fastener configured to retain said guide and pass partially through said elongated opening in said backplate such that said guide is on a first side of said backplate; and
a nut located on a second side of said backplate opposite of said guide, said nut configured to retain said fastener with said backplate, wherein the backplate further comprises:
an indexing track about a portion of said elongated opening.

7. The chain guide assembly of claim 6, wherein said retaining assembly is configured to removably and adjustably frictionally couple said guide at a given location along the elongated opening in said backplate, such that when said guide is rotated axially about said retaining assembly, said guide is retained at said given location, wherein the backplate further comprises:
an indexing track about a portion of said elongated opening.

8. The chain guide assembly of claim 6, wherein the retaining assembly further comprises:
a frictional spacer retained by said fastener between said guide and said backplate, said frictional spacer comprising:
an indexing feature configured to maintain an orientation between said frictional spacer and said backplate; and
a notch configured to provide a frictional connection with at least a portion of said indexing track of said backplate, said frictional connection configured to maintain said guide at said given location when said fastener is loosed such that said guide can be rotated axially about said fastener.

9. The chain guide assembly of claim 8, wherein the indexing feature comprises:
two snap fit retaining arms configured to retain said frictional spacer with said nut in said given location on said backplate, such that removal of said fastener and said guide from said backplate will not change a location of said frictional spacer from said given location.

10. The chain guide assembly of claim 9, wherein said guide is configured in a given orientation with respect to said chain, and the frictional spacer further comprises:
a rotational alignment feature on a side of said frictional spacer facing said guide, said rotational alignment feature configured to identify said given orientation of said guide such that when said fastener and said guide are recoupled with said frictional spacer and said backplate, said guide will be in said given location and can use said rotational alignment feature to return to said given orientation.

11. The chain guide assembly of claim 8, wherein said guide is configured in a given orientation with respect to said chain, and the frictional spacer further comprises:
a rotational alignment feature on a side of said frictional spacer facing said guide, said rotational alignment feature configured to identify said given orientation of said guide such that when a location of said guide is changed from said given location on said backplate, said guide will remain in said given orientation.

12. The chain guide assembly of claim 8, wherein the retaining assembly further comprises:
at least one offset spacer between said guide and said frictional spacer, said at least one offset spacer configured to be removably coupleable with said fastener without requiring a removal of said fastener, said at least one offset spacer configured to modify a horizontal location of said guide with respect to said backplate and said sprocket.

\* \* \* \* \*